March 19, 1929.  G. A. CLARK  1,705,960
AUTOMOBILE VISOR
Filed Jan. 5, 1928  2 Sheets-Sheet 1
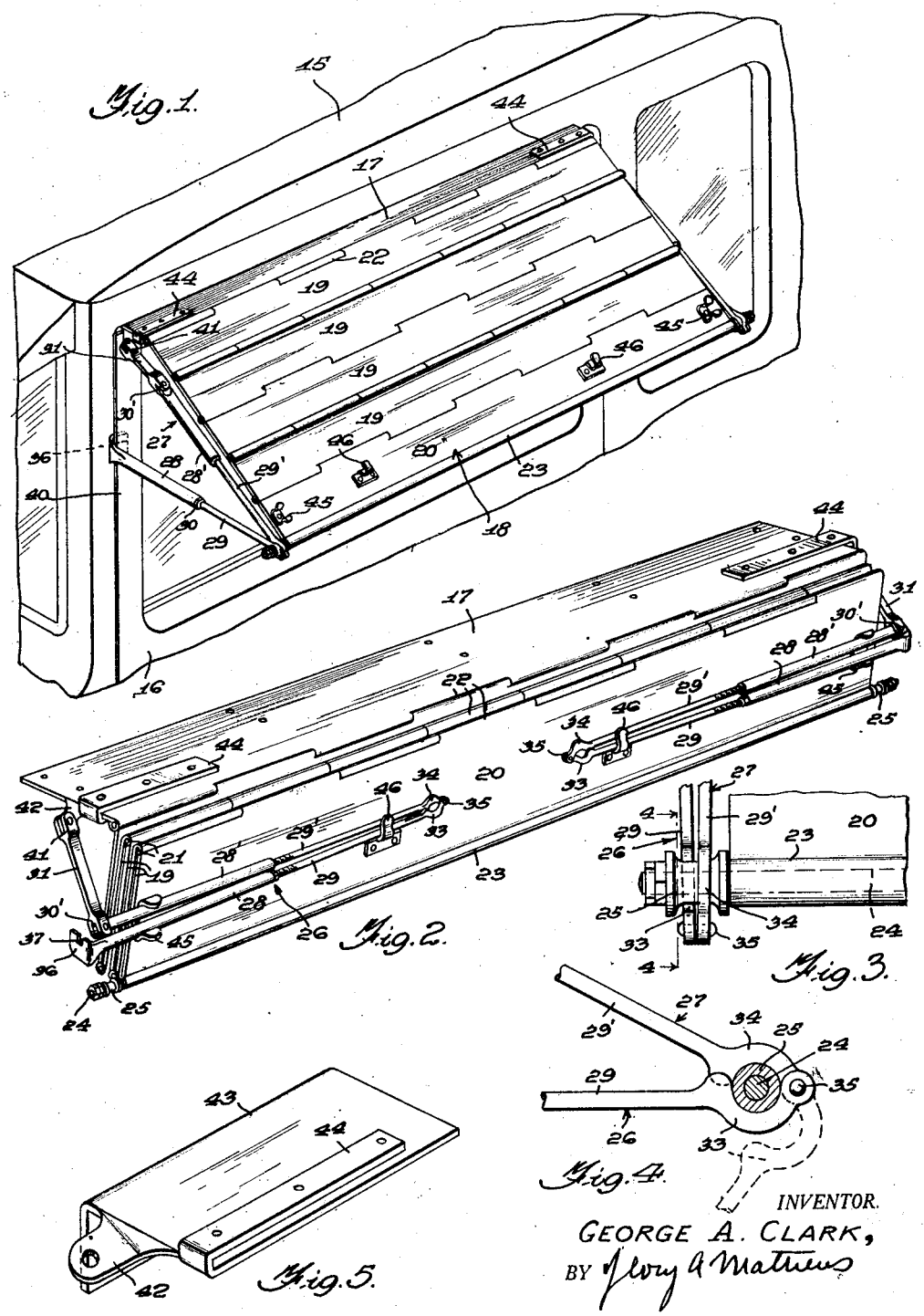
INVENTOR.
GEORGE A. CLARK,
BY
ATTORNEY.

March 19, 1929.  G. A. CLARK  1,705,960
AUTOMOBILE VISOR
Filed Jan. 5, 1928   2 Sheets-Sheet 2
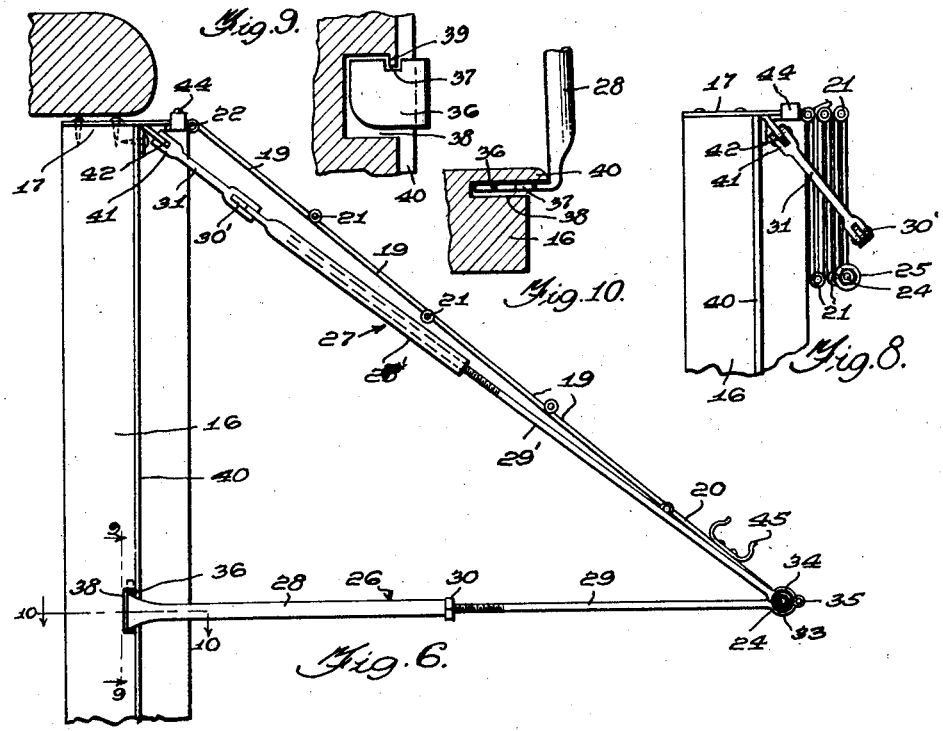
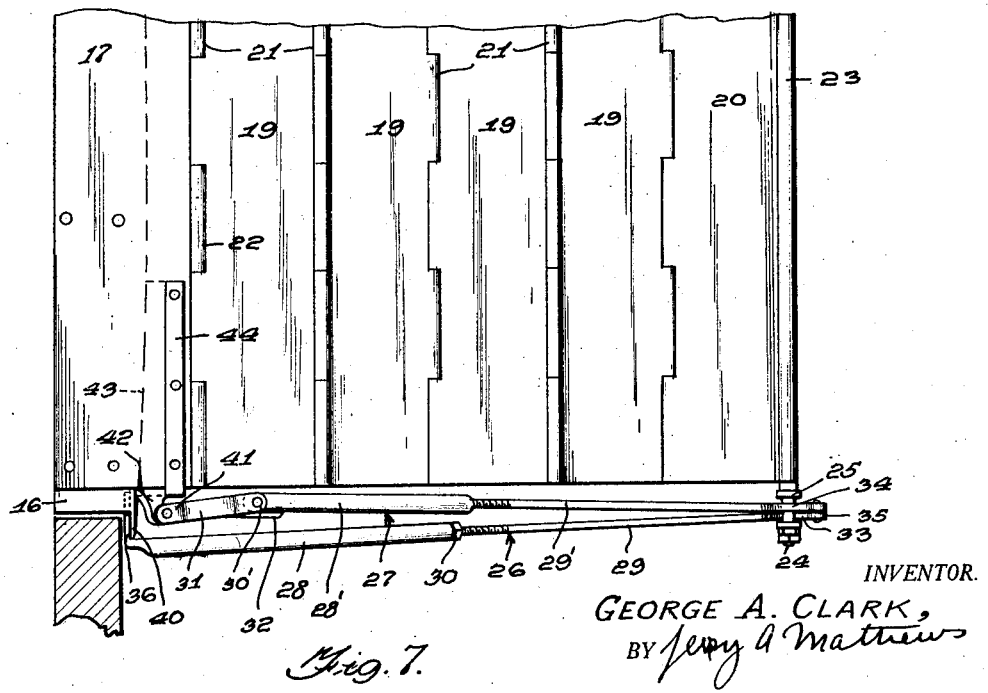
INVENTOR.
GEORGE A. CLARK,
BY *Jerry A. Mathews*
ATTORNEY.

Patented Mar. 19, 1929.

1,705,960

UNITED STATES PATENT OFFICE.

GEORGE A. CLARK, OF ELWOOD, NEBRASKA.

AUTOMOBILE VISOR.

Application filed January 5, 1928. Serial No. 244,693.

My invention relates to visors for use upon automobiles, and has particular reference to improvements in visors, adapted for use in connection with the doors of closed automobiles.

The present invention is an improvement upon the visor shown in my co-pending application for automobile visor, Serial No. 51,253, filed August 19, 1925.

In accordance with the present invention, a visor is produced, which may be mounted upon the side doors of an automobile, although not necessarily restricted to this use.

The visor is made up of a plurality of foldable sections, having hinged joints. When in use, the sections of the visor are shifted to the outer position, and are held under tension in such position by means of tension arms and supporting arms. When the device is not in use, the leaves or sections of the visor are folded flat against each other, and the tension arms and supporting arms are collapsed and carried by one of the leaves or sections. The tension arms then function to hold the collapsed visor against undue movement.

In the accompanying drawings, forming a part of this specification, and in which like numerals are employed to designate like parts throughout the same, Figure 1 is a perspective view of a visor embodying my invention, showing the visor element in the open position, Figure 2 is a similar view, showing the visor element in the collapsed position, Figure 3 is a fragmentary plan view of one end of the visor element and associated elements, Figure 4 is a side elevation of the connected ends of the tension arm and supporting arm, taken on line 4—4 of Figure 3, Figure 5 is a perspective view of the attaching bracket, Figure 6 is an end elevation of the visor, showing the same open, Figure 7 is a fragmentary plan view of the same, open, Figure 8 is an end elevation of the device collapsed, Figure 9 is a vertical section taken on line 9—9 of Figure 6, and, Figure 10 is a horizontal section taken on line 10—10 of Figure 6.

In the drawings, wherein for the purpose of illustration, is shown a preferred embodiment of my invention, the numeral 15 designates the body of a closed automobile having a swinging door 16, which may open either forwardly or rearwardly. A horizontal attaching plate 17 is secured to the top of the door and projects outwardly beyond the same, as shown.

The numeral 18 designates a foldable visor element as a whole, embodying sections or leaves 19 and 20. These leaves are hinged together at their adjacent edges, as indicated at 21, and alternate hinges fold in opposite directions, so that the several leaves may be collapsed to a substantially flat condition, as clearly illustrated in Figures 2 and 8. The innermost leaf 19 is hinged at 22 to the plate 17, as shown at 22.

The outermost leaf 20 is provided at its outer edge with a longitudinally extending sleeve or tube 23, receiving therein a rod 24, which extends outwardly beyond this sleeve or tube. Mounted upon the ends of the rod 24 are spools 25, the periphery of which is preferably longitudinally curved from their ends to the centers.

Arranged at each end of the visor element 18 is a generally horizontal supporting arm 26 and a diagonally arranged tension arm 27. Each supporting arm embodies an inner tubular section 28 and an outer rod section 29. The inner end of the rod section 29 is screw-threaded for screw-threaded engagement with the tubular section 28, and a lock nut 30 is preferably provided. The tension arm 27 embodies an intermediate tubular section 28' and an outer section 29', having screw-threaded engagement within the intermediate tubular section 28'. At its inner end, the tubular section 28' has a hinged knee-joint 30', with an inner section 31. This knee-joint is designed to break outwardly, and has a stop 32 permitting the hinged parts to swing inwardly past dead center.

At its outer end, the rod section 29 carries a curved socket element 33, and the rod section 29' carries a companion curved socket element 34, and these socket elements are permanently hinged together by means of a bolt 35 or the like. This pivotal connection is preferably sufficiently loose to permit of slight turning movement of the supporting arm 26 upon its longitudinal axis, for a purpose to be described.

The socket elements 33 and 34, when closed, constitute a socket, for receiving the contracted portion of the spool 25, and this socket element is adapted to turn slightly upon the spool, if it is desired to turn the arm 26 slightly upon its longitudinal axis. The inner end of each tubular section 28 is provided with a flat attaching blade 36, bent inwardly at a right angle thereto and provided upon one edge with a notch 37. This attaching blade is adapted to engage within a recess 38, cut in the edge of the door, and the notch 37 is adapted to receive a stationary lug 39, carried by the door. The blade 36 extends behind the lip 40 of the door. It is, of course, understood that a recess 38 is cut in both the front and rear vertical edges of the door. By this means, the supporting arm is detachably secured to the vertical edge of the door. Each section 31 is provided at its upper end with a fork 41, engaging over an angularly arranged knuckle 42, formed upon an attaching angle iron 43 and pivoted thereto. This attaching angle iron is arranged beneath and adjacent the end of the plate 17 and carries an overhanging strap 44. This strap and the angle-iron are bolted or otherwise rigidly attached to the plate 17.

Attached to the outermost leaf 20, near its outer end is a resilient U-shaped socket or catch 45 and an upstanding resilient catch 46 is also attached to this leaf, inwardly of and near the U-shaped socket 45. The function of these elements is to receive and hold the collapsed portions of the tension arm 27 and supporting arm 26.

It is preferred that the leaves 19 and 20 of the visor be formed of sheet metal although any other material may be employed which is relatively stiff. It is also preferred to construct the visor in a length suitable for the particular door, in connection with which it is to be used, but the invention is in no sense restricted to this procedure, as the device may be manufactured in the maximum length, and then cut down prior to installation, which can be readily accomplished by removing the rod 24, cutting off a portion of the same and also cutting off a portion of the leaves.

In operation, with the parts arranged as shown in Figure 1, the leaves 19 and 20 of the visor are held in the distended position, due to the action of the tension arms 27 and the supporting arms 26. The knee-joint 30′ of the tension arm breaks outwardly and may be swung inwardly slightly past dead center, whereby the parts are securely held in the opened position. The supporting arms 26 being attached to the vertical edges of the door, co-act with the tension arms to provide triangular supporting arms. To collapse the device, the door is partly or wholly opened. Then a pull is exerted outwardly upon arms 28 and 29′, until joint 30′ breaks outwardly, releasing tension on lower arm. Each supporting arm 26 is turned slightly upon its longitudinal axis, whereby the blade 36 is shifted to cause the lug 39 to clear the notch 37, after which the blade 37 may be separated from the edge of the door. The supporting arm may now be swung outwardly with relation to the tension arm, and the socket elements 33 and 34 will release the spool 23. The supporting arm and tension arm may now be collapsed and the tension arm swung inwardly upon the section 31, the knee-joint 30′ breaking further outwardly. The rod section 29′ can turn freely in the tubular section 28′ and hence the supporting arm and tension arm may be inserted within the resilient socket 45 and catch 46, and will lie flat upon the outermost leaf 20. The tension arm remains permanently attached to the door through the medium of the inner section 31, and hence this connection prevents lateral movements or rattling of the folded or collapsed leaves, which are held in close collapsed condition with the innermost leaf in engagement with the door. To open the visor, the reverse of this operation obviously takes place.

It is to be understood that the form of my invention, herewith shown and described, is to be taken as a preferred example of the same, and that various changes in the shape, size and arrangement of parts may be resorted to without departing from the spirit of my invention, or the scope of the subjoined claims.

Having thus described my invention, I claim:—

1. A visor for an automobile, comprising a visor element embodying a plurality of hinged foldable leaves, and collapsible means for supporting said leaves in the distended position, said collapsible means having detachable connection with one leaf and having one end permanently attached to the automobile door and its opposite end detachably connected therewith, said means when collapsed being carried by the collapsed leaves.

2. A visor for an automobile, comprising a visor element attached to the door of the automobile and including a plurality of hinged foldable leaves, collapsible means for holding the leaves in the distended position and having detachable connection therewith, said means having one end permanently attached to the door and its opposite end detachably connected with the door, said means when collapsed being adapted to extend longitudinally of the collapsed leaves, and holding means carried by one leaf to receive said collapsed means.

3. A visor for an automobile door, comprising a visor element attached to the top of the door and embodying a plurality of hinged leaves, a tension arm arranged at each end of the visor element and pivotally connected with the door near its top, a supporting arm hinged to the free end of the tension arm and forming therewith a socket, means for detachably connecting the inner end of the supporting arm with the door, an element secured to the outer leaf and adapted to engage within said socket, and means for supporting the tension arm and supporting arm when they are collapsed.

4. A visor for an automobile door, comprising a visor element attached to the top of the door and embodying a plurality of hinged leaves, an inclined tension arm arranged at each end of the visor element and including hinged inner and outer sections, means to hinge the inner section to the upper end of the door, a supporting arm at each end of the visor element and arranged beneath the tension arm and having its outer end hinged to the outer end of the tension arm, the adjacent outer ends of said arms being shaped to form a socket, means for detachably connecting the inner end of the supporting arm with the door, an element carried by the outer leaf and adapted to engage within said socket, and means for supporting the arms when collapsed.

5. A visor for an automobile door, comprising a visor element attached to the top of the door and embodying a plurality of hinged leaves, an inclined tension arm arranged at each end of the visor element and including hinged inner and outer sections, means to hinge the inner section to the upper end of the door, a supporting arm arranged at each end of the visor element beneath the tension arm and having its outer end hinged to the outer end of the tension arm, means for detachably connecting the inner end of the supporting arm with the door, the adjacent outer ends of the tension arm and supporting arm being shaped to form a socket, a rod carried by the outer leaf and held within the socket, and holding means secured to the outer leaf and receiving said arms therein when they are collapsed.

6. A visor for an automobile door, comprising a visor element attached to the door and embodying a plurality of hinged leaves, longitudinally adjustable diagonal tension arms secured to the door and to the visor, and longitudinally adjustable supporting arms secured to the ends of the tension arms and detachably secured to the door.

7. A visor for an automobile comprising a visor element embodying a plurality of leaves, hinged means connecting the longitudinal edges of the leaves so that they may be turned upon their longitudinal axes and collapsed for occupying a substantially flat relation, said leaves being adapted to be distended, and collapsible means for supporting the leaves in the distended position and having connection with the automobile door and detachable connection with one of the leaves, and holding means carried by one leaf for detachably receiving the collapsed supporting means.

In testimony whereof I affix my signature.

GEORGE A. CLARK.